US 6,569,351 B1

United States Patent
Baumgardner et al.

(10) Patent No.: US 6,569,351 B1
(45) Date of Patent: May 27, 2003

(54) ACCELERATOR-GEL ADDITIVE FOR USE IN THE PRODUCTION OF POLYMER-MODIFIED ASPHALT

(75) Inventors: Gaylon L. Baumgardner, Jackson, MS (US); Martin R. Burrow, Brandon, MS (US); John Dumas, Ridgeland, MS (US); Andrew Menapace, Florence, MS (US); James Smith, Clinton, MS (US)

(73) Assignee: Ergon, Inc., Jackson, MS (US)

( * ) Notice: Subject to any disclaimer, the term of this patent is extended or adjusted under 35 U.S.C. 154(b) by 0 days.

(21) Appl. No.: 09/525,150

(22) Filed: Mar. 14, 2000

(51) Int. Cl.[7] .......................... C09K 3/00; C08L 95/00; B01F 3/12
(52) U.S. Cl. ........................ 252/182.17; 252/182.13; 524/59; 524/70; 524/68; 516/33; 516/37
(58) Field of Search ............... 252/182.13, 182.17; 524/60, 68, 59, 70; 516/33, 37

(56) References Cited

U.S. PATENT DOCUMENTS

| | | | |
|---|---|---|---|
| 3,903,013 A | * 9/1975 | Foord et al. | |
| 4,145,322 A | 3/1979 | Maldonado | 524/68 |
| 4,154,710 A | 5/1979 | Maldonado | 524/71 |
| 4,196,107 A | * 4/1980 | Jones et al. | |
| 4,237,910 A | * 12/1980 | Khahil et al. | 132/7 |
| 4,330,449 A | 5/1982 | Maldonado et al. | 524/68 |
| 4,390,033 A | * 6/1983 | Khalil et al. | 132/7 |
| 4,412,019 A | 10/1983 | Kraus | 524/71 |
| 4,524,787 A | * 6/1985 | Khalil et al. | 132/7 |
| 4,609,696 A | * 9/1986 | Wilkes et al. | |
| 5,077,042 A | * 12/1991 | Darkwa et al. | 424/71 |
| 5,256,710 A | * 10/1993 | Krivohlavek | 524/59 |
| 5,331,028 A | 7/1994 | Goodrich | 524/68 |
| 5,358,664 A | * 10/1994 | Brauer | |
| 5,371,121 A | 12/1994 | Bellomy et al. | 524/68 |
| 5,401,424 A | * 3/1995 | Vinci et al. | 252/18 |
| 5,405,440 A | 4/1995 | Green et al. | 106/281.1 |
| H1484 H | 9/1995 | Collins | 524/59 |
| 5,672,642 A | 9/1997 | Gros | 524/68 |
| 5,750,598 A | 5/1998 | Krivohlavek et al. | 524/71 |
| 5,756,565 A | 5/1998 | Germanaud et al. | 524/68 |
| 5,773,496 A | 6/1998 | Grubba | 524/68 |
| 5,795,929 A | 8/1998 | Grubba | 524/60 |

* cited by examiner

*Primary Examiner*—Joseph D. Anthony
(74) *Attorney, Agent, or Firm*—Lisa M. Gehrke; Gehrke & Associates, S.C

(57) ABSTRACT

The present invention is directed to a an accelerator-gel additive used to deliver an accelerator such as sulfur, into a system for the production of polymer modified asphalt, vulcanized rubber or similar system. Unlike conventional methods of delivering accelerator into the system, the accelerator-gel additive suspends the accelerator in a gel system thereby preventing the sedimentation of the accelerator during processing. As a result, the polymer and asphalt are processed at lower temperature reducing the production of toxic and flammable gases such as hydrogen sulfide.

5 Claims, No Drawings

ACCELERATOR-GEL ADDITIVE FOR USE IN THE PRODUCTION OF POLYMER-MODIFIED ASPHALT

BACKGROUND OF THE INVENTION

1. Field of the Invention

The present invention relates to the field of polymer modified asphalt compositions and various methods for the preparation of these compositions. More specifically, the present invention relates to a method of making polymer-modified asphalt using an accelerator-gel additive that serves as a carrier for the accelerator in polymer-asphalt formation.

2. Discussion of the Related Art

Polymer-modified asphalt and methods of making polymer-modified asphalt are well known in the art. Polymers, such as thermoplastic elastomer, are commonly bonded with asphalt to improve its strength and performance. It is also know that the stability of the polymer-asphalt compositions can be increased by the addition of sulfur. Sulfur is believed to chemically couple with the polymer and asphalt with sulfide and polysulfide bonds thereby strengthening and accelerating the polymer-asphalt bonding and curing process.

An accelerator such as sulfur may be added to the polymer-asphalt system to enhance the bonding and curing of the polymer and asphalt. Various forms of sulfur accelerators, such as elemental sulfur or sulfur-donating coupling agents including alkyl polysulfide, dithiocarbamates, phosphorous pentasulfide, thiurams, thiazole derivatives, 4,4'-dithiomorpholine are used in polymer asphalt systems. The sulfur may be incorporated with the polymer and asphalt through various methods which typically involve incorporating sulfur in elemental or coupling form into a mixture of polymer and asphalt after the mixture has been agitated for a defined period of time. Alternatively the polymer may be pretreated with sulfur and then the sulfur treated polymer as added to molten asphalt.

Unfortunately, the process of introducing finely divided dry materials, such as sulfur, into reaction vessels or tanks presents an explosion hazard due to the formation and presence of hydrocarbon vapors in combination with elevated processing temperatures. In addition, finely divided dry materials often do not mix thoroughly and efficiently when combined with the liquid material in the system. In an attempt to remedy this problem, the finely divided dry material may be pre-dispersed in oil. However, the tendency for the heavier finely divided material to settle requires constant agitation. More viscous oils and/or asphalt fluxes have been utilized to prevent the settlement of the finely divided material, but the use of these materials requires the application of higher processing temperatures to maintain the oil and or asphalt fluxes at a pumpable viscosity. In addition, this method also requires constant agitation to maintain dispersion of the finely divided material. As a result, the higher temperature need in processing increases the risks of emission of toxic gases, such as hydrogen sulfide, which is highly toxic and flammable. Therefore the processing temperature of highly concentrated sulfur/oil or sulfur/flux systems should not exceed 140° F.

OBJECTS AND SUMMARY OF THE INVENTION

In view of the disadvantages discussed above, it is an object of the present invention to provide a stable, composition for delivering accelerator into the liquid polymer-asphalt mixture during the production of polymer modified asphalt.

It is another object of the present invention to provide a stable accelerator-gel suspension that will not separate during storage or during manufacturing processes incorporating its use such as when added to the polymer asphalt system.

It is further an object of the invention to provide a stable accelerator-gel additive that may be premixed and stored at ambient temperature and is of a liquid or gel nature that offers ease of handling and pumpability under normal processing conditions and at temperatures below 140° F.

In accordance with the foregoing objectives, the present invention provides a polymer modified asphalt formed through a process incorporating an accelerator-gel additive as an accelerator into the polymer-asphalt liquid material during the production of polymer modified asphalt. The accelerator-gel additive may be used in other asphalt related processes such as "catalytic" air blowing for ease of addition of finely divided solid catalyst such as phosphorous pentoxide or ferric chloride, and addition of finely divided materials to neat asphalt such as calcium carbonate addition to highly acidic asphalts. The accelerator-gel additive may be used in other asphalt related processes such as "catalytic" air blowing for ease of addition of finely divided solid catalyst such as phosphorous pentoxide or ferric chloride, and addition of finely divided materials to neat asphalt such as calcium carbonate addition to highly acidic asphalts. The accelerator-gel additive may also be used as an add mixture in processes other than asphalt or polymer modified asphalt additives. Other processes may include but are not limited to compounding and vulcanization of rubber, and injection, extrusion, and molding of polymeric parts and materials. In addition, the present invention provides a method of making the accelerator-gel additive.

The polymer modified asphalt of the present invention is manufactured through the process of forming an accelerator-gel additive, mixing the accelerator-gel additive with a polymer and asphalt to form a mixture, and curing the mixture at a temperature between approximately 200°–500° F., and preferably between approximately 300°–400° F. The resulting polymer-modified asphalt requires less curing time and provides improved storage stability of the polymer modified asphalt formulation exhibited by resistance to phase separation. In addition to improved curing time and stability, these desirable properties are also achieved faster and more efficiently than in conventional processing systems.

The accelerator-gel additive is a composition comprising; an accelerator, a processing oil, an organophillic clay, and optionally, a polar activator. It is formed through a process comprising; combining the accelerator and the organophillic clay with the processing oil to form a smooth mixture. The polar activator is then added slowly and blended into the mixture to separate platelets in the organophillic clay. This will "gel" the oil and thereby suspend the accelerator in a stable form that prevents sedimentation of the accelerator such as finely divided dry sulfur material. Although the accelerator-gel additive is very stable, slight discoloration of the additive may occur over time. This discoloration however, does not effect the performance characteristics of the accelerator-gel additive. The accelerator-gel material is preferably stored in sealed containers to prevent possible oxidation. Slight exudation, if any, of oil may be observed over extended periods of storage. This exudation may be re-incorporated by slight agitation. Increasing the amounts of organophllic clay and polar activator may prevent occurrence of this exudation.

These and other aspects and objects of the present invention will be better appreciated and understood when considered in conjunction with the following description. It should be understood, however, that the following description while indicating the preferred embodiments of the present invention and numerous specific details thereof, is given by way of illustration and not of limitation. Many changes and modifications may be made within the scope of the present invention without departing from the spirit thereof, and the invention includes all such modifications.

DETAILED DESCRIPTION OF THE INVENTION

The present invention and various features and advantageous details thereof are explained more fully with reference to the nonlimiting embodiments that are detailed in the following description. Description of well-known components and process techniques are omitted so as not to unnecessarily obscure the present invention in detail.

The present invention is directed to a novel accelerator-gel additive and its use in the delivery of an accelerator into the polymer asphalt liquid material during the production of polymer-modified asphalt. More specifically, the method of making the polymer modified asphalt comprises, forming the accelerator-gel additive, combining the accelerator-gel additive with the polymer and asphalt, and curing the polymer modified asphalt at a temperature between approximately 200°–500° F., and preferably at a temperature between approximately 300°–400° F. until desired properties are achieved. This time is dependent upon the batch size and mixing capabilities of a given production system.

The accelerator-gel additive formulation includes between approximately; 2.0%–75.0% accelerator, 25.0%–88.0% processing oil; and 0.5%–10.0% clay. In addition, the accelerator-gel additive may further include a polar activator. The amount of polar activator is approximately equal to the ratio by weight % of between 0.5–3.0 parts polar activator: 1.0–5.0 parts clay, and preferably between approximately 1.0 part polar activator: 2.0 parts clay.

The accelerator may be selected from the group including sulfur, 4,4'-Dithiodimorpholine, thiazole derivatives, dithiocarbanates, phosphorous pentasulfide, phosphorous pentoxide, zinc stearate, ammonium stearate, sodium hydroxide, potassium hydroxide, calcium hydroxide, aluminum oxide, or combinations of these or other vulcanizers or accelerators. The accelerator may be powder, flakes, pellets or other suitable form and preferably finely divided powder. In addition, the accelerator may be treated oil as a dust suppressant.

The preferred accelerator is sulfur selected from the group comprising elemental sulfur, rhombic sulfur, or polymeric sulfur and used in the form selected from powder, flakes, or pellets.

The processing oil may be selected from any oil having a flash point of at least 300° F., preferably 425° or above and having a viscosity low enough to mix easily with sulfur at ambient temperature. For example, vegetable oils such as peanut oil, corn oil, olive oil, canola oil, and safflower oil, and petroleum distillate oils such as paraffinic, napthenic, aromatic, mineral, recovered forms of all are acceptable processing oils. The preferred processing oil is Ergon Hyprene L-500 Lube Oil.

The clay is selected from the group including amine treated clay and organophillic clay, and preferably the organophillic clay Baragel 32013.

A polar activator, such as propylene carbonate or an ethanol-water mixture is preferably added to the accelerator-gel additive, and most preferably propylene carbonate.

The preferred formulation of the accelerator-gel additive comprises; approximately 50.0% sulfur, approximately 47.0% Ergon Hyprene L-500 Lube Oil, approximately 2.25% Baragel 32013 and approximately 0.75% propylene carbonate.

The accelerator-gel additive is formed through the process of mixing an accelerator, preferably elemental powdered sulfur, and a clay, preferably Baragel 32013, with a processing oil until it forms a smooth mixture with the appearance of gritty yellow paint. A polar activator, preferably propylene carbonate, is then slowly added to the smooth mixture and stirred until it forms a "gel" which suspends the sulfur in the accelerator-gel additive. The resulting accelerator-gel additive is then stored at ambient temperature, preferably between 40° F. and 140° F. It may be used immediately in the production of polymer-modified asphalt or stored indefinitely.

Though the aforementioned is the preferred process, alternative methods of manufacturing the accelerator-gel additive include but are not limited to; premixing of the accelerator and the clay and then adding it to the processing oil, adding the accelerator-clay mixture to the processing oil, and combining the polar activator forming a gelled product to which the accelerator is post added.

After the accelerator-gel additive is formed, it is then added to a mixture of polymer and asphalt at a temperature of between approximately 200°–500° F., and preferably between approximately 300°–400° F. As has been discussed, the addition of the accelerator-gel additive to asphalt polymer blends improves the storage stability and time to achieving desired properties. Though there are several ways to achieve accelerator cross-linking in asphalt polymer blends, the preferred form is with finely divided sulfur material in for form the powdered or flaked elemental sulfur. It is known to those skilled in the art that addition of sulfur in the finely divided form poses the problems of safety and handling previously mentioned. The accelerator-gel additive allows the addition of sulfur to the asphalt polymer blend in a form and manner that serves to limit and eliminate most of the concerns of handling and safety present in the conventional methods of addition of finely divided dry materials to liquid asphalt polymer blend.

The accelerator-gel additive may be added to the asphalt polymer blend at various stages of production, it may be added to concentrates between approximately 1.0%–25.0% polymer, and preferably between approximately 2.0%–18.0% polymer. It should be noted that some asphalt polymer blends having higher concentrations of polymers may be adversely effected by the addition of accelerator. The accelerator-gel additive may be effectively added to polymer asphalt blends diluted from concentrates, which are diluted with either neat, processed, or polymer containing asphalts. The accelerator-gel additive may also be added to the dilution asphalt prior to dilution of the asphalt polymer concentrate. The preferred method of accelerator-gel additive addition is either at the point of the asphalt dilution, or during the final product formulation.

The polymer used in the production of polymer modified asphalt of the present invention is selected from the group comprising polymers with unsaturated hydrocarbon chains including Polyisoprene (rubber) Styrene-Butadiene Rubber (SBR), Ethylene-Propylene-Diene Monomers (EPDM), Styrene-Isoprene-Styrene (SIS), and Styrene-Butadiene- Styrene (SBS) and is preferably Styrene-Butadiene-Styrene (SBS). These polymers may be used in singular form or as compounds of multiple polymers or polymer types, such as linear, branched, grafted or combinations of various types.

The asphalt is selected from the group including asphalt derived from distillation of crude oil, natural occurring asphalt, Trinidad Lake Asphalt (TLA), gilsonite, and processed asphalts to include blended asphalts of various grades and sources, and air blown asphalt. The preferred asphalt is neat asphalt derived from distillation of crude oil.

The mixture comprising accelerator-gel additive, polymer and asphalt is then cured at a temperature between approximately 200°–500° F., and preferably between approximately 300°–400° F. until the desired properties are achieved. This time is dependent upon the batch size and mixing capabilities of a given production system until the desired properties are achieved. This time is dependent upon the batch size and mixing capabilities of a given production system.

Resulting polymer modified asphalt has the properties of decreased curing time providing improved storage stability of the polymer modified asphalt formulation exhibited by resistance to phase separation. In addition to improved curing time and stability, desirable properties are also achieved in a more timely manner.

All the disclosed features of each disclosed embodiment can be combined with, or substituted for, the disclosed features of every other disclosed embodiment except where such features are mutually exclusive. It is intended that the appended claims cover all such additions, modifications and rearrangements. Expedient embodiments of the present invention are differentiated by the appended subclaims.

What is claimed is:

1. An accelerator-gel additive for use in the production of an asphalt-containing composition, the accelerator-gel additive comprising:
   A. a gel including;
      1. a processing oil;
      2. an organophillic clay; and,
      3. a polar activator; and,
   B. an accelerator suspended within the gel;
      wherein, the percentage of;
      i. processing oil is approximately 47.0%;
      ii. organophillic clay is approximately 2.25%;
      iii. polar activator is approximately 0.75% and,
      iv. accelerator is approximately 50.0%.

2. The accelerator-gel additive of claim 1, wherein the accelerator is selected from the group consisting of;
   sulfur,
   4,4'-Dithiodimorpholine,
   thiazole derivatives,
   dithiocarbanates,
   phosphorous pentasulfide,
   phosphorous pentoxide,
   zinc stearate,
   ammonium stearate,
   sodium hydroxide,
   potassium hydroxide,
   calcium hydroxide,
   aluminum oxide, and,
   combinations thereof.

3. The accelerator-gel additive of claim 1, wherein the accelerator is a sulfur-containing compound.

4. The accelerator-gel additive of claim 1, wherein the processing oil is selected from the group consisting of vegetable oil and petroleum distillate oil.

5. The accelerator-gel additive of claim 1, wherein the polar activator is selected from the group consisting of, propylene carbonate and an ethanol-water mixture.

* * * * *